US008651936B2

(12) United States Patent
Smith et al.

(10) Patent No.: US 8,651,936 B2
(45) Date of Patent: Feb. 18, 2014

(54) KENO GAME WITH REARRANGING SYMBOLS

(76) Inventors: Ray Smith, Linden, NJ (US); Amanda Tears Smith, Linden, NJ (US)

( * ) Notice: Subject to any disclaimer, the term of this patent is extended or adjusted under 35 U.S.C. 154(b) by 0 days.

(21) Appl. No.: 13/465,310

(22) Filed: May 7, 2012

(65) Prior Publication Data

US 2013/0296012 A1 Nov. 7, 2013

(51) Int. Cl.
*A63F 13/00* (2006.01)

(52) U.S. Cl.
USPC .................................. 463/18; 463/16; 463/17

(58) Field of Classification Search
USPC ...................................................... 463/16–21
See application file for complete search history.

(56) References Cited

U.S. PATENT DOCUMENTS

| | | | | |
|---|---|---|---|---|
| 2006/0025193 | A1 * | 2/2006 | Gail et al. | 463/16 |
| 2007/0173312 | A1 | 7/2007 | Dodge | |
| 2007/0184887 | A1 * | 8/2007 | Cannon | 463/16 |
| 2008/0070670 | A1 | 3/2008 | Brunelle et al. | |
| 2008/0108408 | A1 * | 5/2008 | Wolf | 463/20 |
| 2009/0197664 | A1 | 8/2009 | Schultz | |
| 2010/0041459 | A1 * | 2/2010 | Saffari et al. | 463/19 |

* cited by examiner

*Primary Examiner* — Ronald Laneau
*Assistant Examiner* — Justin Myhr
(74) *Attorney, Agent, or Firm* — Mark A. Litman & Associates, P.A.

(57) ABSTRACT

A wagering game is played on an electronic system with a processor, a video display screen and a player input system. The processor recognizing a wager, enabling player input at the specific player position. The processor executes code to display a grid of at least 50, preferably at least 80 frames for display of a unique symbol within each frame of the grid. The processor compares recognized at least three symbols at the specific player position with at least 10 symbols selected by the processor. The processor displays a first arrangement of unique symbols within each frame prior to recognizing selection at the specific player position, and B) the processor displays a second arrangement of the same unique symbols after recognizing selection at the specific player position, the first arrangement of symbols being different from the second arrangement of symbols with respect to distribution of symbols among the frames.

23 Claims, 7 Drawing Sheets

KENO GAME WITH REARRANGING SYMBOLS

BACKGROUND OF THE INVENTION

1. Field of the Invention

The present invention relates to the field of wagering games, particularly casino wagering games, and more particularly casino wagering games similar to well known wagering games such as Keno and variants of Keno.

2. Background of the Art

Keno is similar to Lotto. It was first introduced in China many years ago. The game was brought to the United States in the mid 1800's by Chinese immigrants who came to work in the mines and on the railroad. It is a very popular game and very easy to play. It is an exciting pastime and, most importantly, it offers the possibility of winning large payouts on relatively small wagers.

Keno is usually played in Casino lounges specifically allocated for the game, but there are so called 'Keno runners' who will collect tickets and deliver the winnings if the player wants to play from outside the lounge area. There are many television monitors spread all over the Casino halls to keep players informed of the winning numbers. There is also the video version of Keno. These are video slot-like coin, credit or ticket-in operated machines. It plays using the same principle with similar rules of the regular Keno, but the results occur much faster.

To play Keno, a player selects a minimum of 4 but no more than 10 numbers between 1 and 80. Each selection is called a 'Spot', so if 10 numbers are selected, a 10 Spot game is being played. Keno tickets are located at tables throughout the Casino and in the Casino's Keno lounge. The Casino provides a 'Keno crayon' for this purpose. A player simply marks a blank Keno ticket (or virtual electronic ticket on a gaming device) with the numbers of the selection. The ticket is presented to the Keno desk (or received by a processor that executes code to effect game play) with the wager and the clerk provides a duplicate ticket (or the processor indicates the selections on the video display). In a few minutes (or in less than a minute on electronic play), twenty numbered Keno balls will be drawn at random from a barrel containing 80 numbered balls (or 20 virtual balls or 20 random numbers are provided by a random number generator associated with and in communication with the processor), and if enough of the selected numbers are drawn, a winning event outcome occurs. The results are displayed on screens (or the video screen), called Keno boards, throughout the Casino.

Minimum bets can be as low as 5 cents, although some Casinos only accept bets of $1 or more. The house's Keno brochures gives information about payoffs and various tickets that can be played. The amount of money won is dependent upon the type of ticket played and the number of 'spots' caught. A player may wager on as many tickets as desired. One could win as much as $50,000 on a $1 wager in some Casinos.

The round of a Keno game is called a Keno race. In many Casinos, 'multi-race' Keno is featured, where one can play a number of consecutive Keno races at one time. The house advantage on Keno varies according to the Keno game played. It is always around 30% or more. The chance of hitting one number in 80 is 0.25.

Many variants and side bet or bonus games have been developed for play with Keno. Published U.S. Patent Application Document No. 20080070670 (Brunelle) describes a keno game including a set of playable symbols, from which a set of player symbols are selected. A set of winning symbols are selected from a set of potential winning symbols, with the set of potential winning symbols including the set of playable symbols and at least one wild symbol. The wild symbol may match any one of the player symbols, none of the player symbols, or a range of player symbols. The playable symbols are preferably numbers. Payouts preferably follow a pay table having a weighted probability based on the total number of symbols in the set of potential winning symbols.

Published U.S. Patent Application Document No. 20070173312 (Dodge) describes a novel Keno game wherein a player selects up to ten numbers from a field of eighty numbers to be played and these numbers are compared to twenty numbers randomly selected by the game from the same field of numbers in a manner known in the prior art. When the player places one or more conventional bets on the outcome of the game, they now also place one or more side bets as to the number of hits or matches there will be between the player selected numbers and twenty numbers selected by the game computer. The player may place side bets on more than one number of hits or matches to increase their odds of achieving side bet winnings Published U.S. Patent Application Document No. 20090197664 (Schultz) discloses a keno game having a bonus round. The keno game provides a player with an additional opportunity to win, after the keno balls have been drawn, to add excitement and volatility to the standard keno game. According to one method, the gaming machine receives the player's input, with the player selecting one or more numbers. A keno draw, which includes a plurality of numbers from a keno pool, is then displayed to the player. A bonus round is initiated in response to a trigger event. The bonus round is a random selection of one or more numbers in addition to the numbers previously selected from the keno draw. The numbers selected from the bonus round are displayed to the player. The numbers selected by the player are evaluated again the numbers from the keno draw results as well as the bonus round, and a payout for any winning outcomes are awarded to the player.

Published U.S. Patent Application Document No. 20060178196 (Thomas) describes a method of playing a keno-type wagering game. The method includes conducting the keno-type wagering game at a gaming terminal. The keno-type wagering game has a plurality of game cards and a plurality of symbols. At least some of the plurality of symbols to be used by a player in the wagering game is displayed to the player. A first set of symbols from the plurality of symbols is selected, and applies to all of the plurality of game cards. The method further includes randomly generating a plurality of second sets of symbols from the plurality of symbols. Each of the plurality of second sets includes a first symbol and each of the first symbols of each of the plurality of second sets is displayed simultaneously. In response to at least one of the symbols of the plurality of second sets matching a symbol from the first set, the player receives an award.

Additional variations in the play of casino games, including Keno are desired in the art. All references cited herein are incorporated in their entirety by reference.

SUMMARY OF THE INVENTION

A wagering game is played on an electronic system with a processor, a video display screen and a player input system. The processor recognizing a wager, enabling player input at the specific player position. The processor executes code to display a grid of at least 50, preferably at least 80 frames for display of a unique symbol within each frame of the grid. The processor compares recognized at least three symbols at the specific player position with at least 10 symbols selected by the processor. The processor displays a first arrangement of unique symbols within each frame prior to recognizing selection at the specific player position, and B) the processor displays a second arrangement of the same unique symbols after recognizing selection at the specific player position, the first arrangement of symbols being different from the second arrangement of symbols with respect to distribution of symbols among the frames.

DETAILED DESCRIPTION OF THE INVENTION

Figure 1:
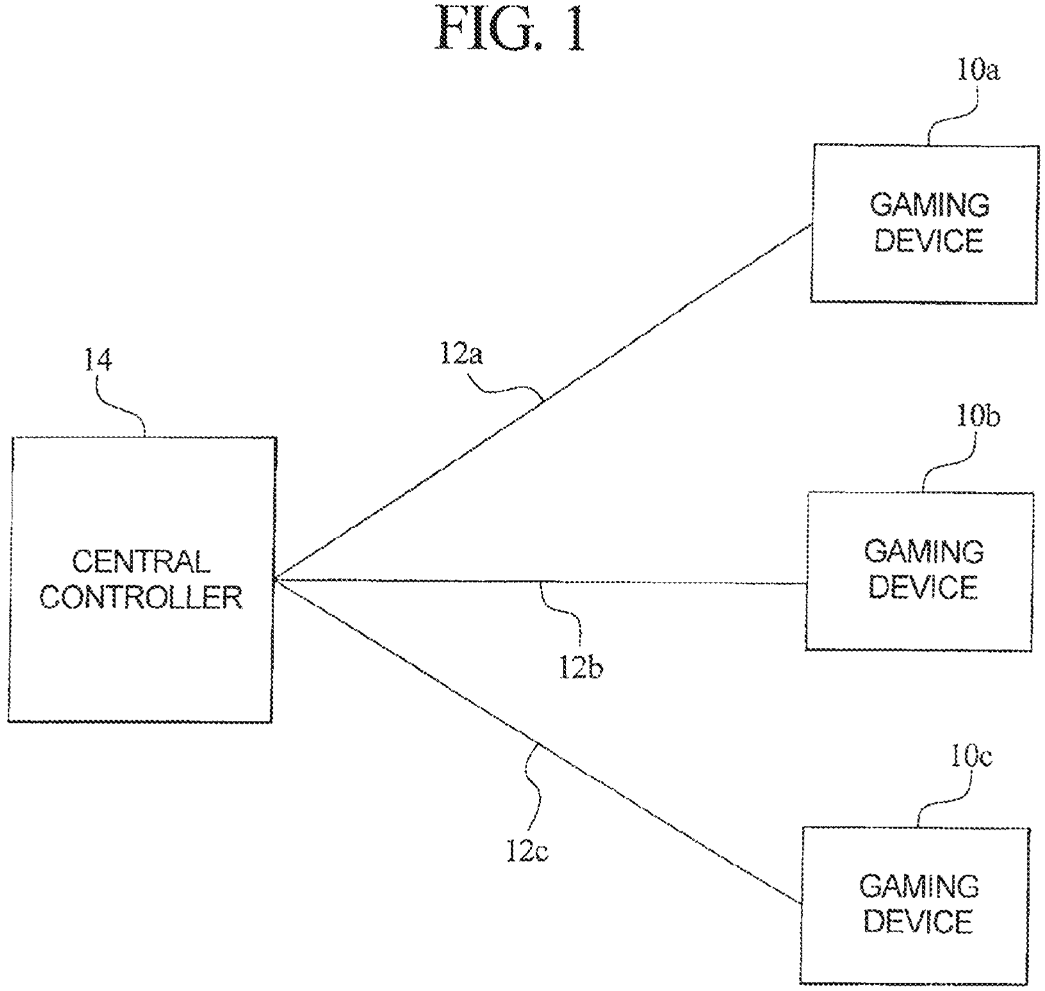
FIG. 1 is a schematic block diagram illustrating a plurality of gaming terminals in communication with a central controller.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" means any one or more microprocessors, CPU devices, computing devices, microcontrollers, digital signal processors, or like devices.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G, 4G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

Some embodiments can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present disclosure.

FIG. 1 is a schematic block diagram illustrating a plurality of gaming terminals 10*a*, 10*b* and 10*c* in communication through lines 12*a*, 12*b* and 12*c*, respectively, with a central controller 14.

Figure 2A:
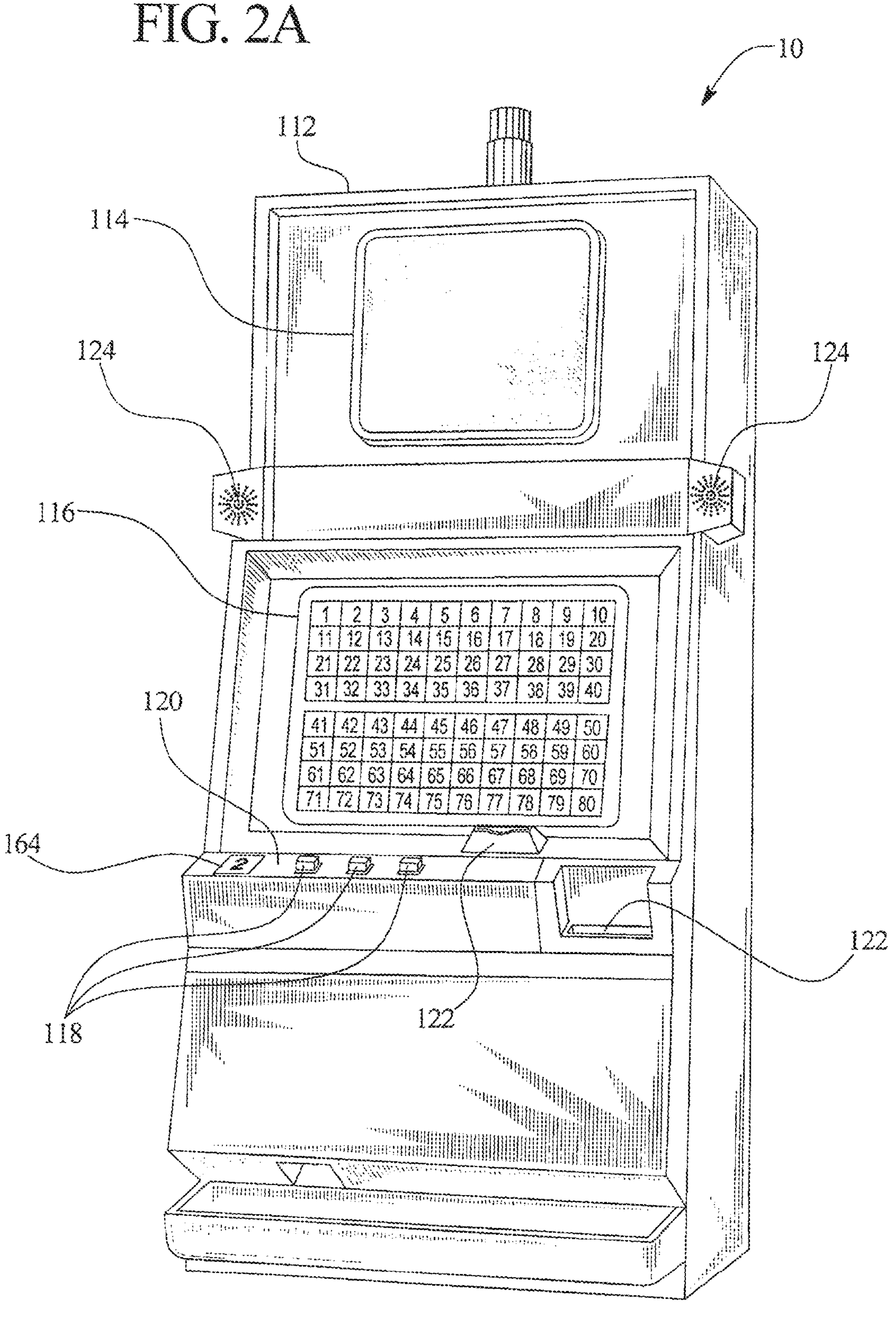
FIGS. 2A to 2C are perspective views of one embodiment of the gaming terminal of the present invention illustrating the player selecting numbers and the gaming terminal generating numbers based on the selected game outcome seed.
Figure 2B:
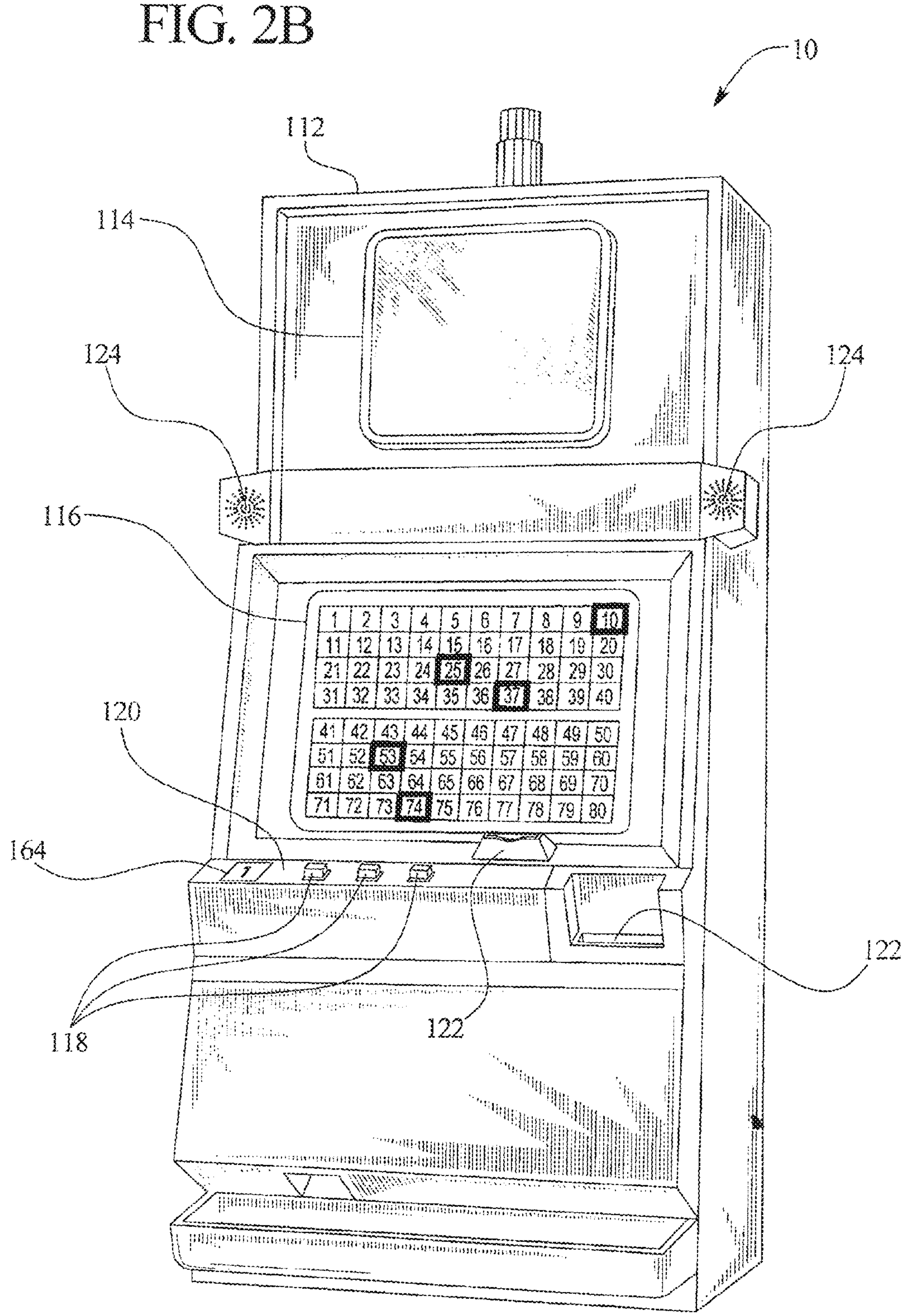
Figure 2C:
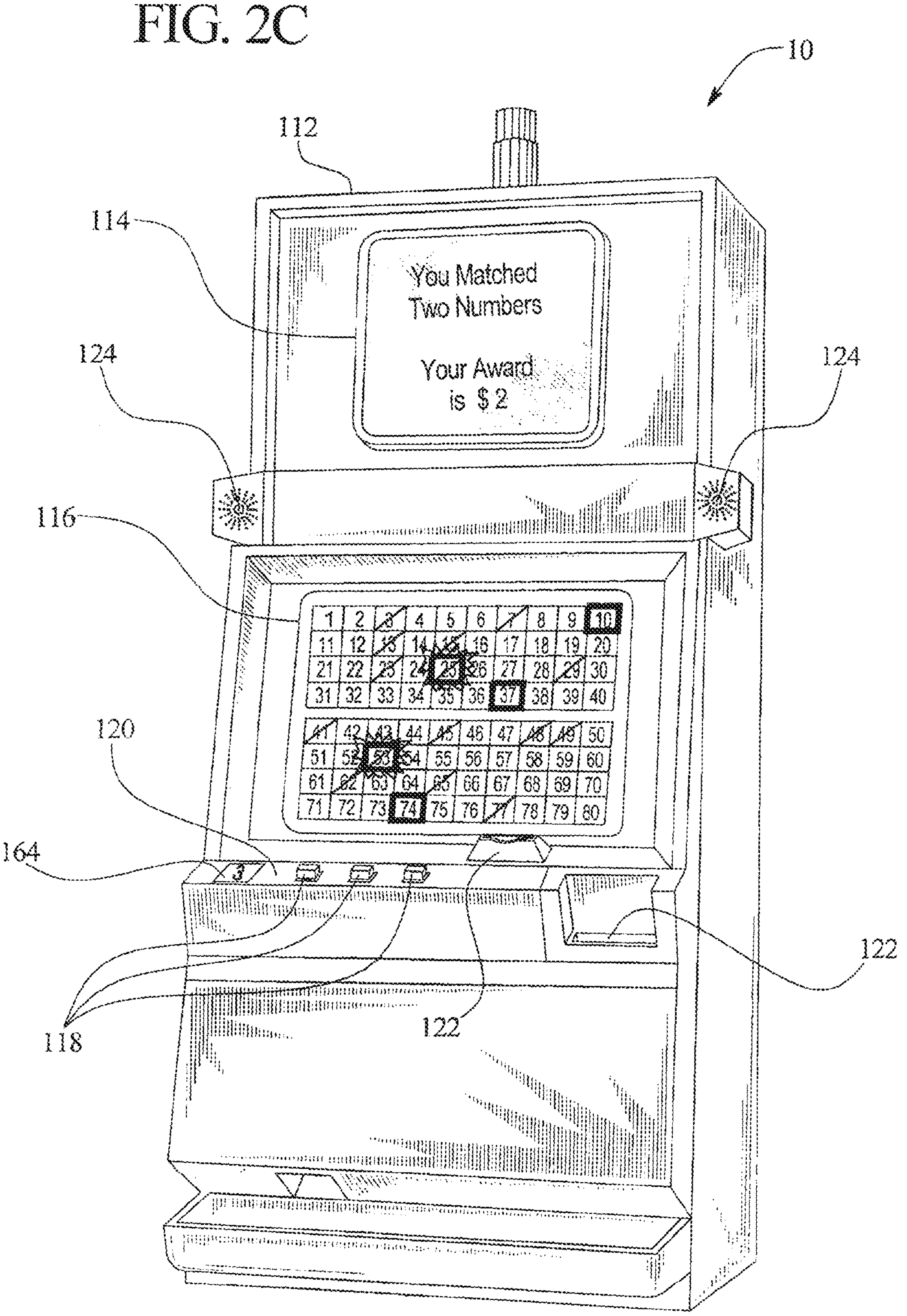

Referring now to FIGS. 2A to 2C, each of the embodiments described herein is provided in one preferred embodiment in a gaming terminal 10. Alternatively, the embodiments are provided on various monitors throughout a casino or gaming establishment, including traditional Keno boards and electronic terminals and video gaming equipment. Gaming terminal 10 is in one embodiment a video gaming device and includes a cabinet 112 having at least one video monitor. The illustrated embodiment includes two video monitors 114 and 116. Cabinet 112 is illustrated as being of a type where the player stands or sits. The cabinet is alternatively a bar top cabinet, wherein the player sits to play the Keno game of the present invention.

The cabinet 112 also provides controls for a player to operate gaming terminal 10. In the illustrated embodiment, various electromechanical input devices 118 are provided on a tilted portion 120 of the cabinet 112, below video monitors 114 and 116. Electromechanical input devices 118 each send a discrete signal to a microprocessor located within cabinet 112. These input devices enable the player to perform the various Keno functions, including but not limited to, selecting at least one of the Keno numbers or game choices, playing multiple games at once, wagering a number of credits per game and cashing out. The input devices 118 may also enable the player to play multiple Keno games in a row.

Similar to the electromechanical input devices 118, cabinet 112 of gaming terminal 10 can provide electromechanical displays that show, for example, the player's credits maintained within gaming terminal 10, the number of Keno numbers played, the bet per game, etc. In one preferred embodiment, however, these functions as well as others are provided on one or more video monitor or display devices 114 and 116. In one embodiment, display device 114 may show the pays for a number of hits or matches between the numbers or game choices that the player selects and the numbers or game choices that gaming terminal 10 marks or illuminates. Displays 114 and 116 can also inform the player of the rules concerning the operation of the Keno game of the present invention.

Video monitors 114 and 116 display, among other items: (i) the Keno numbers or game choices generated by the gaming terminal 10 based on the game outcome seed; (ii) the modified Keno numbers or game choices; (iii) the numbers played by the player; (iv) the wager per game; (v) the player's total wager and (vi) the player's Keno award, if any. In one embodiment, credit display 164 displays the player's accumulated credits. In one embodiment, when the player selects a number or game choice, gaming terminal 10 highlights it as a certain color, for example, yellow. When the gaming device generates a number or game choice or uses the bidirectional map to modify a number or game choice, gaming terminal 10 highlights it as a different color, for example, blue. When a match occurs, the number is highlighted by a third color, for example, green, a combination of blue and yellow.

Cabinet 112 of gaming terminal 10 also includes one or more monetary input devices 122. The monetary input device 122 can accept coins, cash, a smart card, a credit card, a debit card, a casino card, ticket-in/ticket out wagering/accounting systems or other type of gaming device card. Keno gaming terminal 10 can also include a ticket reader and a ticket printer (not illustrated) that enables the player to input and receive a redeemable ticket in lieu of cash. The ticket reader/validator and printer operate with a processor housed inside gaming terminal 10.

Figure 3:
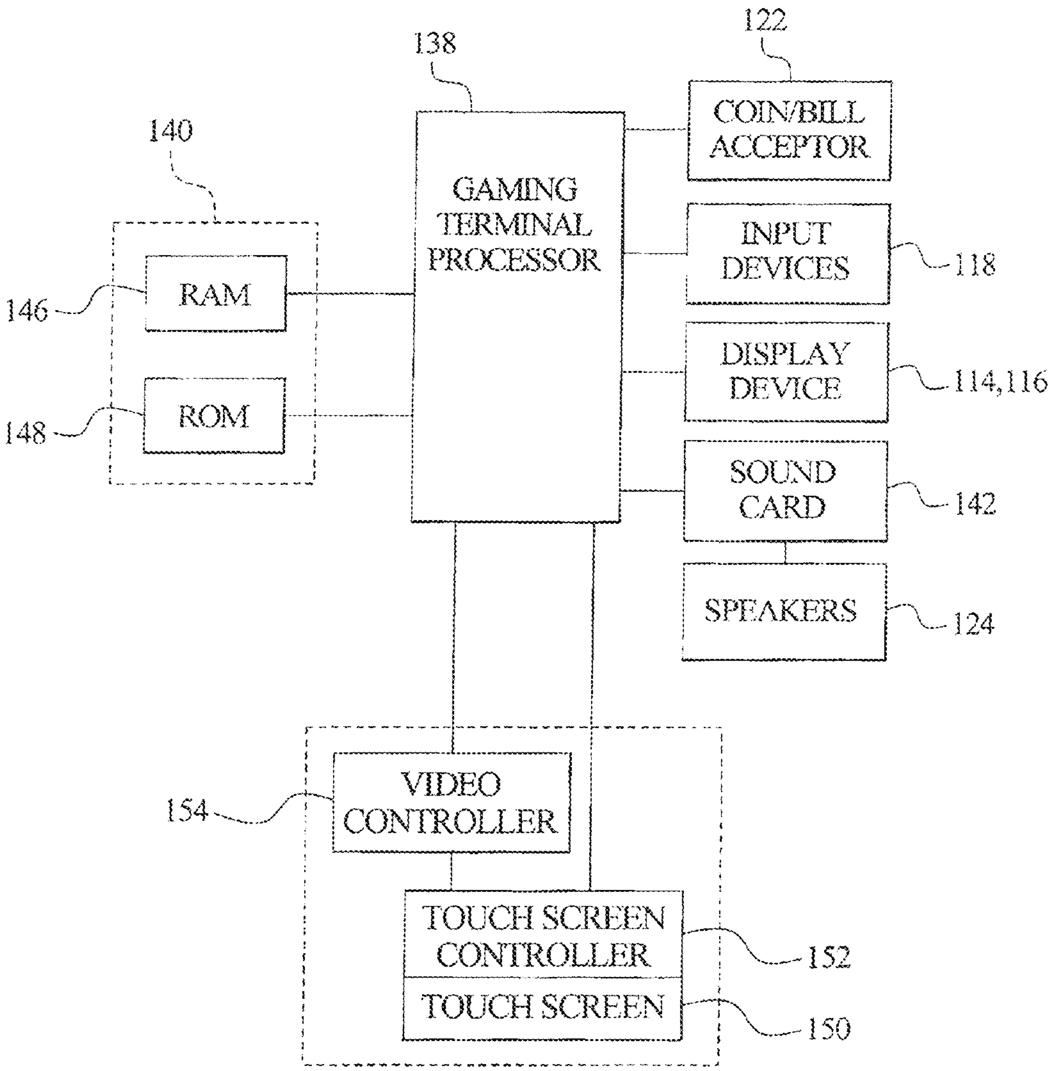
FIG. 3 is a schematic of a gaming terminal run by a processor or central processing unit ("CPU") and a memory device.

Referring now to FIG. 3, gaming terminal 10 is run by a processor or central processing unit ("CPU") 138 and a memory device 140 that operates with one or more display devices 114 and 116 that display the generated Keno numbers. Processor 138 can be a microprocessor and have a microcontroller-based platform. The processor 138 is operable with a communication device which is in communication with the central controller. The memory device 140 includes random access memory ("RAM") 146 and read only memory ("ROM") 148. The platform for the processor 138 and memory device 140 can be: (i) inside gaming terminal 10; or (ii) as stand alone components in the casino, part of a server/client system, data network, one or more application-specific integrated circuits (ASIC's), field programmable gated arrays (FPGA's) or one or more hard-wired devices. Furthermore, although the processor 138 and memory device 140 preferably reside on each gaming terminal 10 unit, it is possible to provide at least the function of selecting a game outcome seed (that is deterministic of a game outcome) from a pool or set of game outcome seeds, at a central location by a central controller such as a network server for communication to a playing station such as over a local area network (LAN), wide area network (WAN), Internet connection, microwave link, and the like.

Cabinet 112 of gaming terminal 10 also provides a number of speakers 124 that operate via a soundcard 142 with processor 138 to inform the player of any type of output, outcome or instruction of gaming terminal 10.

Gaming terminal 10 provides an electromechanical input device 18 or simulated input device provided by a touch screen 150 that operates via a touch screen controller 152 and a video controller 154 with the processor 138. The input devices enable the player to operate the Keno gaming terminal 10 of the present invention. One of the video monitors 114 and 116 and possibly, additionally the speakers 124 are used to explain: (i) when . . . ; (ii) how many . . . ; (iii) how much; and (iv) the type of award provided for obtaining the required number of matches.

The Keno game of the present invention can include any suitable variation of Keno. For purposes of the present invention, the game is illustrated in combination with the variation sometimes referred to as 'horse race' or Nevada Keno. In this Keno game, one or more players play against the house.

In addition to winning base game credits, the gaming terminal 10, including any of the base games disclosed above, also includes secondary or bonus games that give players the opportunity to win credits. The gaming terminal 10 preferably employs a video-based display device 130 or 132 for the secondary or bonus games. The secondary or bonus games include a program that automatically begins when the player achieves a qualifying condition or a secondary game triggering outcome in the base game, such as a certain number of matches, a specific number matched or a any other suitable triggering event.

The game play of the keno game of the present invention is initiated by a player inserting the appropriate amount of money or tokens at one of the plurality of gaming terminals in communication with the central controller (14 in FIG. 1). The gaming terminal enables the player to push one of the electromechanical pushbuttons or touch the touch screen that operates with the display device to select one or more numbers or game choices to play from a plurality of different player selectable numbers or game choices as described herein. It should be appreciated that while numbers are used to describe the present invention, other suitable game choices such as symbols, images or indicia may be implemented with the keno game of the present invention.

Figure 4:
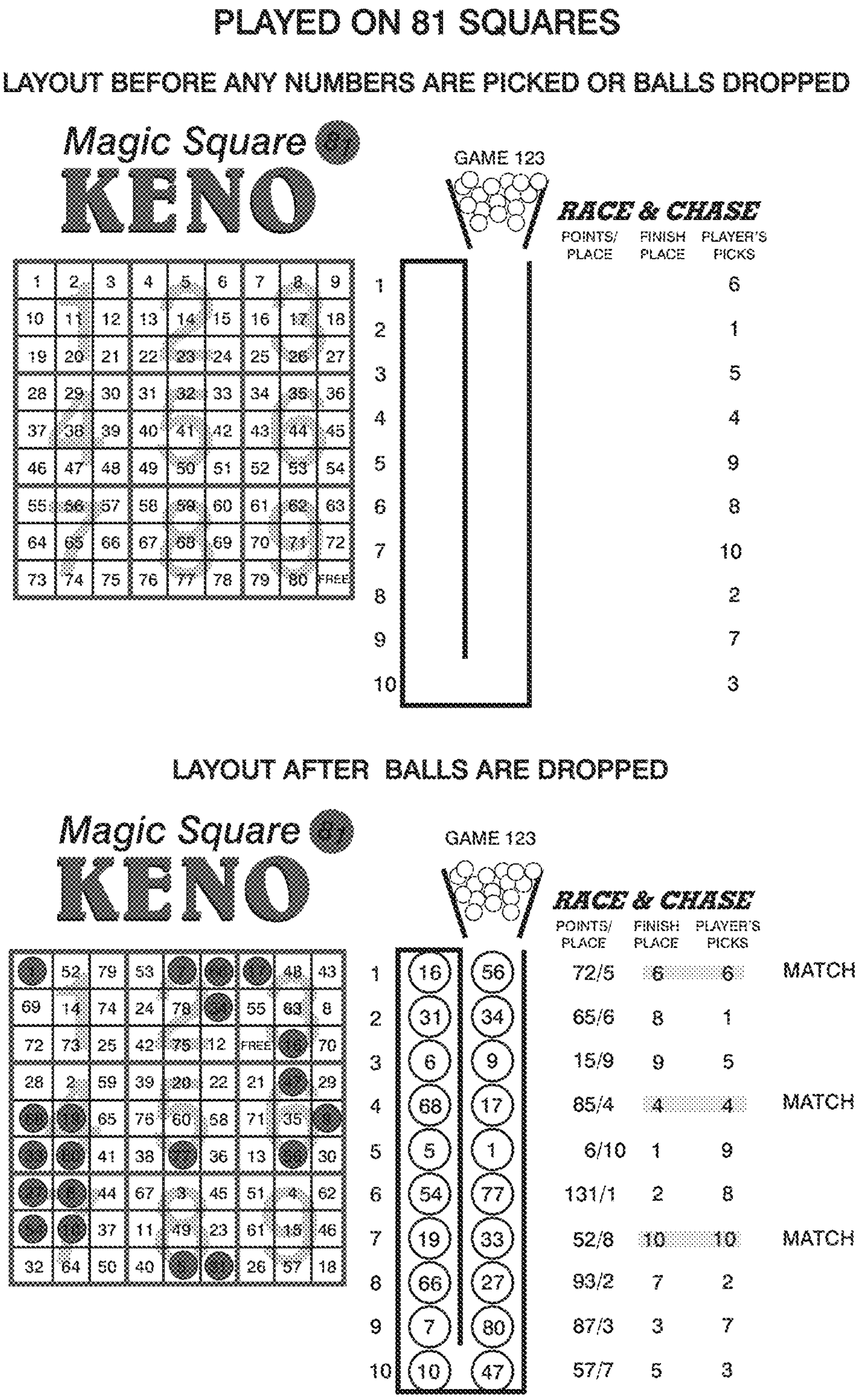
FIG. 4 shows a layout of the board played on 81 squares and ball drop provision before and after balls have been called, with the squares rearranged.
Figure 5:
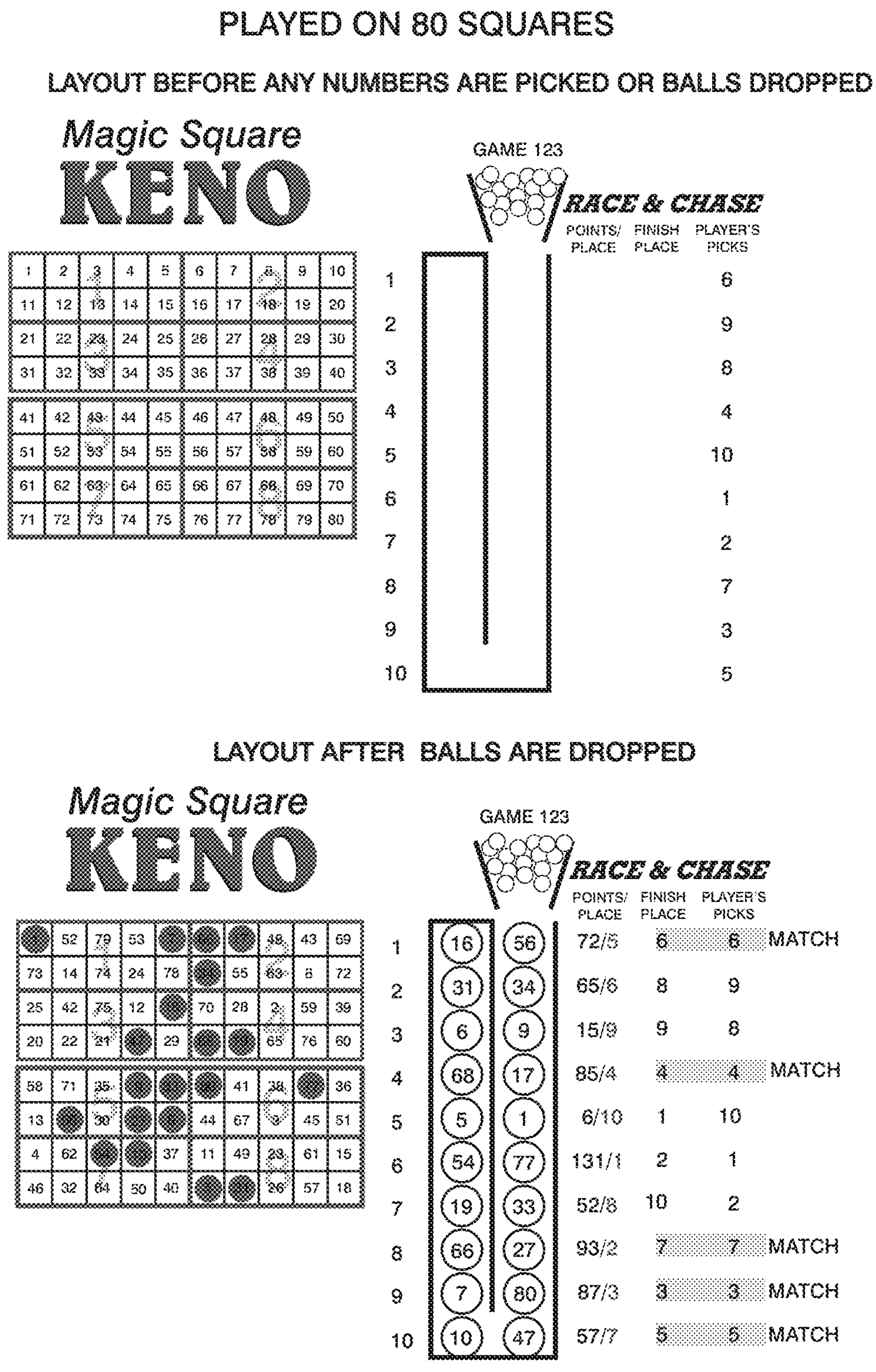
FIG. 5 shows a layout of the board played on 80 squares and ball drop provision before and after balls have been called, with the squares rearranged.

FIG. 4 shows a first arrangement of numbers in a keno display screen and an associated Race & Chase game, and then a second arrangement of numbers in a keno display screen and an associated Race & Chase game, with a different distribution of the numbers in the second arrangement.

A method of playing a keno-type wagering game, the method comprising: conducting the keno-type wagering game at a gaming terminal, the keno-type wagering game having a plurality of game cards (e.g., the traditional 81 or 80 or without a free space) or the subset of smaller cards within the total number card of 80 or 81, as further described herein)

and a plurality of symbols; displaying at least some of the plurality of symbols to be used by a player in the wagering game;

selecting a first set of symbols from the plurality of symbols, the first set of symbols applying to all of the plurality of game cards; and randomly generating a plurality of second sets of symbols from the plurality of symbols, wherein each of the plurality of second sets includes a first symbol and each of the first symbols of all of the plurality of second sets are displayed simultaneously, and wherein each of the plurality of second sets of symbols corresponds to one of the plurality of game cards; in response to at least one of the symbols of the plurality of second sets matching a symbol from the first set, awarding the player a winning award.

The present technology may be described as including at least a method of playing a wagering game on a system comprising a processor, a video display screen and a player input system.

This general method may include steps of:

a processor recognizing a wager placing value at risk at a specific player position;

the processor allowing player input at the specific player position where a wager has been recognized so that symbol selections in the play of the wagering game may be recognized at that specific player position;

the processor executing code to display a grid of 9×9 frames to provide frames for display of symbols in the wagering game and displaying a unique symbol within each frame of the grid;

the processor recognizing selection of either at least three specific frames or at least three specific symbols at the specific player position from the player input system at that specific player position;

the processor executing code to randomly select a) at least 10 symbols from a set of at least 80 separate and distinct symbols or b) at least 10 frames from the grid;

the processor executing code to compare recognized at least three symbols or at least three frames at the specific player position with the at least 10 symbols or at least 10 frames randomly selected by the processor;

the processor resolving the wager placing value at risk on a basis of degree of correspondence between the at least three symbols or at least three frames at the specific player position with the at least 10 symbols or at least 10 frames randomly selected by the processor.

The method may generally include at least steps wherein A) the processor executes code to display a first arrangement of unique symbols within each frame prior to recognizing selection at the specific player position, and B) the processor executes code to display a second arrangement of the same unique symbols after recognizing selection at the specific player position and before resolving the wager, the first arrangement of symbols being different from the second arrangement of symbols with respect to distribution of symbols among the frames.

The method may be practiced wherein each frame of the grid has a unique 1 of 80 symbols displayed therein in the first arrangement, and/or wherein there is a single inactive symbol in a single frame of the grid in the first arrangement, and/or wherein the processor recognizes only selection of specific symbols at the player position and the processor executes code to randomly distribute the same unique symbols in step B), and/or wherein the processor executes code to select at least 20 symbols from the set of at least 80 separate and distinct symbols.

The method may also allow the processor to execute code to select at least 20 symbols from the set of at least 80 separate and distinct symbols. The method may also allow the processor to execute code so that one frame is occupied by an inactive symbol separate from the at least 80 symbols.

The method may be practiced wherein the processor recognizes a second wager placing a second value at risk at a player position in which a wager is made on at least three frames within a contiguous 3×3 grid within the 9×9 grid, and the second wager is resolved on a basis of degree of correspondence between the at least three frames at the specific player position with the at least 10 symbols randomly selected by the processor. Alternatively the processor recognizes a second wager placing a second value at risk at a player position in which a wager is made on at least three frames within any number of contiguous 3×3 grids (either 1 grid, up to 9 grids, or even non-patterned grids, such as rather than spaces 1-3, 10-12 and 20-22 forming a first 3×3 grid in an upper left section of a 9×9 grid, wagering on frames 2-4, 11-13 and 21-23 within the 9×9 grid) within the 9×9 grid, and the second wager is resolved on a basis of degree of correspondence between the at least three frames at the specific player position with the at least 10 symbols randomly selected by the processor or the processor recognizes a second wager placing a second value at risk at a player position in which a wager is made on at least three symbols appearing within a specific contiguous 3×3 grid within the 9×9 grid, and the second wager is resolved on a basis of degree of correspondence between the at least three symbols at the specific player position with the at least 10 symbols randomly selected by the processor. In playing the full card or small-card (e.g., 3×3 bingo variant of the keno game, there are at least two options for play. Al credit wager may cover all 3×3 grids; and if any of 3×3 grids have a valid bingo pattern after the 20 symbols are selected, the player will win (lower payouts) based on the number of 3×3 grids with valid bingos. Although the "free space" in a 9×9 keno card is usually an inactive space (although it may be a truly free "winning" space in a 3×3 pick, especially when all nine possible 3×3 sub-cards are selected) as its location becomes random), it may be an inactive frame in the keno games, but may be a "free space" in any wagers that include the bingo variant.

Alternatively, Players can wager 1-9 (or more) credits on specific bingo cards (including th individual 3×3 bingocards) as you would wager the desired number of credits on lines in a slot machine). If a Player wagered on Cards 1-3 only, and card 4 had a valid bingo, the player would NOT win.

As a still further alternative, the processor recognizes a third class of wager in which the processor executes code to compare numbers or value of symbol correspondence in nine contiguous 3×3 grids, and the recognized third wager selects ones of the nine contiguous grids for numbers or value of corresponding symbols as compared to other ones of the nine contiguous grids, and the processor resolves the third recognized wager for accurate selection at least one contiguous grid with respect to numbers or value of corresponding symbols as compared to other ones of the nine contiguous grids. In this last mode of play, the processor may execute code to compare the nine grids in order of greatest number or value of corresponding symbols within each of the nine grids at least in a first highest, second highest and third highest order of correspondence within 3×3 grids and resolving the third wager based on processor recognized first highest, second highest and third highest order of correspondence within 3×3 grids and resolving the third wager based on a processor recognized third wager on first highest, second highest and third highest order of correspondence within 3×3 grids. The order of finish in the individual grids may be likened to Win, Place and Show wagers in a horse race. In the race variant, where players have identified an order of "finish" for total absolute value of symbol matches within respective 3×3 grids, or that total absolute value is used to break ties between or among grids with identical numbers of symbols in correspondence with the randomly processor selected symbols, the total absolute value of the matched symbols may be a component of the award. That is, where frames have been originally selected, the frames are randomly filled with numbers, the processor randomly selects numbers, and the randomly selected numbers are compared with the numbers in the randomly filled frames or squares, the actual numeric values (e.g., 3, 9, 46, 65, 78, etc.) may be added within the 3×3 squares as a comparative feature, either for breaking ties or paying a special award (e.g., when a 3×3 grid has an absolute numeric total in excess of a predetermined number (such as, for example, ≥150, ≥160, 175, etc.). In the race variant, this is a convenient way for breaking ties. If a tie still exists, the tie could be finally broken by another evaluation of the grid that contains the lowest matched number, the highest matched number and/or the free space.

For example, in this last wager event, the nine grids may be identified as 1, 2, . . . 9 or A, B, . . . J and the player may make such various wagers on the relative order of finish as C in first place (a Win bet), F in second place (a Place bet), I in third place (a Show bet), A in first place and E in second place (a Perfecta) or B in first place, A in second place and J in third place (a Trifecta wager), or other specific combinations of relative position wagers.

Additionally, in addition to wagering on win, place, show, exacta, and trifecta, game play could offer the option to place all 9 grids in a predicted finish order. For example: $1^{st}$-G; $2^{nd}$-A, $3^{rd}$-F, $4^{th}$-B, $5^{th}$-C, $6^{th}$-D, $7^{th}$-E, $8^{th}$-I, $9^{th}$-H. Wins would be based on the number correctly predicted. If Grid A did come in $2^{nd}$ and Grid C did come in $5^{th}$, but all other grids came in a different finish order, the player would have 2 hits and be paid accordingly.

Variations and options and alternative play within the scope of this generic invention could be practiced by those skilled in the art and be within the scope of the claims in this patent document.

What is claimed:

1. A method of playing a wagering game on a system comprising a processor, a video display screen and a player input system, the method comprising:

a processor recognizing a wager placing value at risk at a specific player position;

the processor enabling player input at the specific player position where a wager has been recognized so that at least one of symbol selections and frame selections in the play of the wagering game may be recognized at that specific player position;

the processor executing code to display a grid of at least 80 frames to provide frames for display of symbols in the wagering game and displaying a unique symbol within each frame of the grid;

the processor recognizing selection of either at least three specific frames or at least three specific symbols at the specific player position from the player input system at that specific player position;

the processor executing code to randomly select a) at least 10 symbols from a set of at least 80 separate and distinct symbols or b) at least 10 frames from the grid;

the processor executing code to compare recognized at least three symbols or at least three frames at the specific player position with the at least 10 symbols or at least 10 frames randomly selected by the processor;

the processor resolving the wager placing value at risk on a basis of degree of correspondence between the at least three symbols or at least three frames at the specific player position with the at least 10 symbols or at least 10 frames randomly selected by the processor;

wherein A) the processor executes code to display a first arrangement of unique symbols within each frame prior to recognizing selection at the specific player position, and B) the processor executes code to display a second arrangement of the same unique symbols after recognizing selection at the specific player position and before resolving the wager, the first arrangement of symbols being different from the second arrangement of symbols with respect to distribution of symbols among the frames; and after the display of the second arrangement, the resolution of the wager is based upon either at least three specific frames or at least three specific symbols at the specific player position from the player input system at that specific player position as they appear in the second arrangement.

2. The method of claim 1 wherein the grid comprises 9×9 frames.

3. The method of claim 2 wherein there is a single inactive symbol in a single frame of the grid in the first arrangement.

4. The method of claim 3 wherein the processor executes code to select at least 20 symbols from the set of at least 80 separate and distinct symbols.

5. The method of claim 2 wherein the processor executes code to select at least 20 symbols from the set of at least 80 separate and distinct symbols.

6. The method of claim 5 wherein one frame is occupied by an inactive symbol separate from the at least 80 symbols.

7. The method of claim 6 wherein the processor recognizes a second wager placing a second value at risk at a player position in which a wager is made on at least three frames within a contiguous 3×3 grid within the 9×9 grid, and the second wager is resolved on a basis of degree of correspondence between the at least three frames at the specific player position with the at least 20 symbols randomly selected by the processor.

8. The method of claim 6 wherein the processor recognizes a second wager placing a second value at risk at a player position in which a wager is made on at least three symbols appearing within a specific contiguous 3×3 grid within the 9×9 grid, and the second wager is resolved on a basis of degree of correspondence between the at least three frames at the specific player position with the at least 20 symbols randomly selected by the processor.

9. The method of claim 5 wherein the processor recognizes a second wager placing a second value at risk at a player position in which a wager is made on at least three frames within a contiguous 3×3 grid within a 9×9 grid, and the second wager is resolved on a basis of degree of correspondence between the at least three frames at the specific player position with the at least 10 symbols randomly selected by the processor.

10. The method of claim 2 wherein the processor recognizes a third class of wager in which the processor executes code to compare numbers of symbol correspondence in nine contiguous 3×3 grids, and the recognized third wager selects ones of the nine contiguous grids for numbers of corresponding symbols as compared to other ones of the nine contiguous grids, and the processor resolves the third recognized wager for accurate selection at least one contiguous grid with respect to for numbers of corresponding symbols as compared to other ones of the nine contiguous grids.

11. The method of claim 2 wherein the processor executes code to compare the nine grids in order of greatest number of corresponding symbols within each of the nine grids at least in a first highest, second highest and third highest order of correspondence within 3×3 grids and the processor resolving the third wager based on processor recognized first highest, second highest and third highest order of correspondence within 3×3 grids.

12. The method of claim 1 wherein each frame of the grid has a unique 1 of 80 symbols displayed therein in the first arrangement.

13. The method of claim 12 wherein the processor executes code to select at least 20 symbols from the set of at least 80 separate and distinct symbols.

14. The method of claim 13 wherein the processor recognizes a second wager placing a second value at risk at a player position in which a wager is made on at least three frames within a contiguous 3×3 grid within a 9×9 grid, and the second wager is resolved on a basis of degree of correspondence between the at least three frames at the specific player position with the at least 10 symbols randomly selected by the processor.

15. The method of claim 1 wherein the processor recognizes only selection of specific symbols at the player position and the processor executes code to randomly distribute the same unique symbols in step B).

16. The method of claim 15 wherein one frame is occupied by an inactive symbol separate from the at least 80 symbols and the grid comprises 9×9 frames.

17. The method of claim 15 wherein the processor recognizes a second wager placing a second value at risk at a player position in which a wager is made on at least three frames within a contiguous 3×3 grid within a 9×9 grid, and the second wager is resolved on a basis of degree of correspondence between the at least three frames at the specific player position with the at least 10 symbols randomly selected by the processor.

18. The method of claim 1 wherein the processor executes code to select at least 20 symbols from the set of at least 80 separate and distinct symbols.

19. The method of claim 1 wherein one frame is occupied by an inactive symbol separate from the at least 80 symbols.

20. The method of claim 1 wherein the processor recognizes a second wager placing a second value at risk at a player position in which a wager is made on at least three frames within a contiguous 3×3 grid within a 9×9 grid, and the second wager is resolved on a basis of degree of correspondence between the at least three frames at the specific player position with the at least 10 symbols randomly selected by the processor.

21. The method of claim 1 wherein the processor recognizes a second wager placing a second value at risk at a player position in which a wager is made on at least three symbols appearing within a specific contiguous 3×3 grid within a 9×9 grid, and the second wager is resolved on a basis of degree of correspondence between the at least three frames at the specific player position with the at least 10 symbols randomly selected by the processor.

22. A method of playing a wagering game on a system comprising a processor, a video display screen and a player input system, the method comprising:

a processor recognizing a wager placing value at risk at a specific player position;

the processor enabling player input at the specific player position where a wager has been recognized so that symbol selections in the play of the wagering game may be recognized at that specific player position;

the processor executing code to display a grid of 9×9 frames to provide frames for display of symbols in the of the wagering game and displaying a unique symbol within each frame of the grid;

the processor recognizing selection of at least three specific symbols at the specific player position from the player input system at that specific player position;

the processor executing code to randomly select a) at least 10 symbols from a set of at least 80 separate and distinct symbols or b) at least 10 frames from the grid;

the processor executing code to compare recognized at least three symbols or at least three frames at the specific player position with the at least 10 symbols or at least 10 frames randomly selected by the processor;

the processor resolving the wager placing value at risk on a basis of degree of correspondence between the at least three symbols at the specific player position with the at least 10 symbols or at least 10 frames randomly selected by the processor;

wherein A) the processor executes code to display a first arrangement of unique symbols within each frame prior to recognizing selection at the specific player position, and B) the processor executes code to display a second arrangement of the same unique symbols after recognizing selection at the specific player position and before resolving the wager, the first arrangement of symbols being different from the second arrangement of symbols with respect to distribution of symbols among the frames.

23. A method of playing a wagering game on a system comprising a processor, a video display screen and a player input system, the method comprising:

a processor recognizing a wager placing value at risk at a specific player position;

the processor enabling player input at the specific player position where a wager has been recognized so that at least one of symbol selections and frame selections in the play of the wagering game may be recognized at that specific player position;

the processor executing code to display a grid of at least 80 frames to provide frames for display of symbols in the wagering game and displaying a unique symbol within each frame of the grid;

the processor recognizing selection of either at least three specific frames or at least three specific symbols at the specific player position from the player input system at that specific player position;

the processor executing code to randomly select a) at least 10 symbols from a set of at least 80 separate and distinct symbols or b) at least 10 frames from the grid;

the processor executing code to compare recognized at least three symbols or at least three frames at the specific player position with the at least 10 symbols or at least 10 frames randomly selected by the processor;

the processor resolving the wager placing value at risk on a basis of degree of correspondence between the at least three symbols or at least three frames at the specific player position with the at least 10 symbols or at least 10 frames randomly selected by the processor;

wherein A) the processor executes code to display a first arrangement of unique symbols within each frame prior to recognizing selection at the specific player position, and B) the processor executes code to display a second arrangement of the same unique symbols after recognizing selection at the specific player position and before resolving the wager, the first arrangement of symbols being different from the second arrangement of symbols with respect to distribution of symbols among the frames.

* * * * *